United States Patent Office 2,712,028
Patented June 28, 1955

2,712,028

PROCESS FOR PREPARING 11α-ACYLOXY-3,20-DIKETO PREGNANES

George Rosenkranz, Mexico City, Mexico, and Carl Djerassi, Birmingham, Mich., assignors to American Syntex Incorporated, Hato Rey, Puerto Rico, a corporation of Puerto Rico No Drawing. Application February 20, 1953, Serial No. 338,145

Claims priority, application Mexico February 22, 1952

7 Claims. (Cl. 260—397.45)

The present invention relates to novel cyclopentanophenanthrene derivatives and to a novel process for the production thereof. More particularly the present invention relates to the production of allopregnan-11α-ol-3,20-dione and esters thereof. The novel compounds of the present invention are useful intermediates for the production of Δ⁴-pregnen-11α-ol-3,20-dione (11α-hydroxyprogesterone) which in turn is a key intermediate for the production of cortical hormones. As an example allopregnan-11α-ol-3,20-dione or an ester thereof may be treated with bromine to produce the 2,4-bromo derivative thereof. Treatment of the 2,4-dibromo derivative upon treatment with sodium iodide gives the 2-iodo-Δ⁴-derivative and deiodination of this last compound as with zinc gives Δ⁴-pregnen-11α-ol-3,20-dione or the ester thereof. Saponification of the esters will of course produce the free compound and the free compound may be readily oxidized to 11-keto progesterone as with chromic acid. 11-keto progesterone may then be transformed, for example, to 11-dehydrocorticosterone by any conventional method for introducing the 21-hydroxy groups as by treatment with lead tetracetate.

In our United States patent application Serial No. 307,722, there is disclosed the diesters of allopregnen-3β,11α-diol-20-one, as for example, the diacetate.

In accordance with the present invention it has been discovered that the aforementioned diesters may be partially saponified to the corresponding 11-monoesters of allopregnan-3β,11α-diol-20-one and these monoesters can be oxidized to 11-monoesters of allopregnan-11α-ol-3,20-dione. Conventional saponification of these monoesters will in turn produce the corresponding free compounds.

A similar reaction when utilized with the corresponding pregnan compounds and/or compounds with the 3α hydroxy group will similarly give pregnan-11α-ol-3,20-dione and/or esters thereof. These last novel compounds are also useful for the production of the same cortical hormones since they may be also provided with the Δ⁴-3-keto structure by simple bromination and dehydrobromination.

The following equation illustrates the present invention:

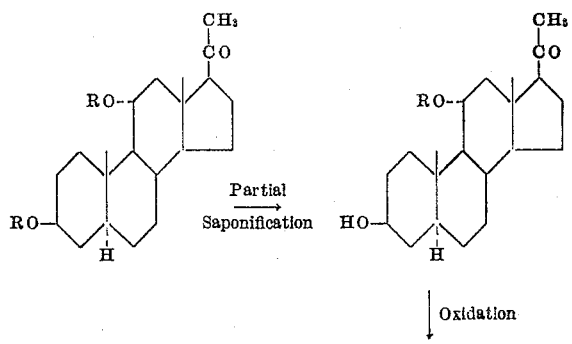

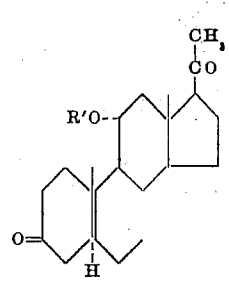

In the above equation R represents an acyl group corresponding to the residue of any organic acid customarily used for the esterification of steroid alcohols. Preferably R represents the residue of a lower fatty acid, such as propionic or acetic, or the residue of an aromatic acid such as benzoic. R¹ represents the same acyl groups as R and in addition hydrogen.

In practicing the process above outlined a diester of a pregnan-3,11α-diol-20-one such as allopregnan-3β,11α-diol-20-one diacetate is treated with approximately one molar equivalent of a mild saponifying agent, such as an alkali metal bicarbonate under mild conditions. The resultant compound namely allopregnan-3β,11α-diol-20-one 11-monoacetate was suitably purified.

The monoester produced in the first step could then be oxidized to the corresponding pregnane-11α-ol-3,20-dione 11-monoester as for example, allopregnan-11α-ol-3,20-dione acetate which could be conventionally saponified to the free compound. For the oxidation an oxidizing agent such as an aluminum alkoxide, for example, aluminum isopropylate, aluminum t-butylate or aluminum phenoxide, in the presence of a hydrogen acceptor preferably a ketone such as cyclohexanone or acetone may be used. An inert organic solvent such as toluene or benzene is also preferably used. Other suitable oxidizing agents are, for example, N-bromoacetamide or chromic acid.

The following specific examples serve to illustrate, but are not intended to limit the present invention:

Example I

A solution of 3 g. of allopregnan-3β,11α-diol,20-one diacetate in 200 cc. of methanol was refluxed during 30 minutes with 0.86 g. of potassium bicarbonate previously dissolved in 30 cc. of water. The mixture was poured into water containing hydrochloric acid and the product was extracted with ether, washed, dried and evaporated to dryness. Crystallization from acetone-hexane yielded colorless crystals of allopregnan-3β,11α-diol-20-one 11-monoacetate with a melting point of 177°–179° C., $[\alpha]_D + 47°$ (chloroform).

The same reaction could be carried out by saponification of the diacetate with sodium bicarbonate at room temperature during 48 hours. Furthermore, some other esters, such as the dipropionate or the dibenzoate, could be used.

Example II

A solution of 1 g. of the 11-monoacetate obtained according to Example I in 20 cc. of glacial acetic acid was treated dropwise and under continuous stirring with a mixture of 230 mg. of chromic acid, 1 cc. of water and 5 cc. of acetic acid. After two hours' standing at room temperature, the mixture was poured into water and the product was extracted with ether, washed, dried over sodium sulfate and evaporated to dryness. The residue was crystallized from acetone-hexane to give colorless crystals of allopregnan-11α-ol-3,20-dione 11-monoacetate with a melting point of 177°–178° C. The melting point of this compound showed a depression of 30° in mixture with the compound obtained according to Example I.

The infrared spectrum showed absence of the characteristic band of free hydroxy groups, $[\alpha]_D + 85°$ (chloroform).

The same reaction could be carried out by reaction with 1.3 molar equivalents of N-bromoacetamide in solution in pyridine and keeping the mixture at room temperature for 20 hours.

Saponification by refluxing during 40 minutes with 2% alcoholic solution of sodium (or potassium) hydroxide, and working up in the usual way gave the free allopregnam-11α-ol-3,20-dione with a melting point of 195°–197° C., $[\alpha]_D +83.8°$ (chloroform).

*Example III*

A solution of 2 g. of allopregnan-3β,11α-diol-20-one 11-monoacetate in 40 cc. of anhydrous toluene and 17.6 cc. of cyclohexanone was refluxed with 1 g. of aluminum isopropylate during 4 hours. A saturated solution of sodium-potassium tartrate was added and the mixture was subjected to steam distillation. The residue was extracted with ethyl acetate and the organic layer was washed with water, dried over sodium sulphate and evaporated to dryness. The residue was crystallized from acetonehexane giving allopregnan-11α-ol-3,20-dione acetate, identical to the one obtained according to Example II.

We claim:

1. A process for the production of a pregnan-11α-ol-3,20-dione ester selected from the class consisting of lower fatty acid esters and benzoic acid esters which comprises treating a corresponding pregnan-3,11α-diol-20-one diester with approximately one molar equivalent of a sanopifying agent to form the corresponding 11-monoester and oxidizing the 11-monoester with an oxidizing agent.

2. The process of claim 1 wherein the saponifying agent is an alkali metal carbonate and the oxidizing agent is selected from the class consisting of an aluminum alkoxide in the presence of a hydrogen acceptor, N-bromoacetamide and chromic acid.

3. The process of claim 1 wherein the saponifying agent is an alkali metal carbonate and the oxidizing agent is selected from the class consisting of an aluminum alkoxide in the presence of a hydrogen acceptor, N-bromoacetamide and chromic acid.

4. The process of claim 1 wherein the product is an allopregnan-11α-ol-3,20-dione ester and the starting compound is a corresponding allopregnan-3β,11α-diol-20-one diester.

5. The process of claim 2 wherein the product is an allopregnan-11α-ol-3,20-dione ester and the starting compound is a corresponding allopregnan-3β,11α-diol-20-one diester.

6. The process of claim 1 wherein the product is allopregnan-11α-ol-3,20-dione acetate and the starting compound is allopregnan-3β,11α-diol-20-one diacetate.

7. The process of claim 2 wherein the product is allopregnan-11α-ol-3,20-dione acetate and the starting compound is allopregnan-3β,11α-diol-20-one diacetate.

References Cited in the file of this patent

UNITED STATES PATENTS

| | | |
|---|---|---|
| 2,602,769 | Murray et al. | July 8, 1952 |
| 2,647,134 | Hogg | July 28, 1953 |
| 2,647,135 | Nathan | July 28, 1953 |